United States Patent
Chapman

[15] 3,655,417
[45] Apr. 11, 1972

[54] CLAY PROCESSING

[72] Inventor: John H. Chapman, Sandersville, Ga.

[73] Assignee: Georgia Kaolin Company, Elizabeth, N.J.

[22] Filed: Mar. 2, 1970

[21] Appl. No.: 15,837

[52] U.S. Cl.............................106/288 B, 106/72, 23/110 P
[51] Int. Cl..........................................................C09c 1/42
[58] Field of Search........................106/72, 288 B; 23/110 P

[56] References Cited

UNITED STATES PATENTS 3,353,668  11/1967  Duke...................................106/288 B Primary Examiner—James E. Poer
Attorney—Buell, Blenko & Ziesenheim

[57] ABSTRACT

A method of bleaching discolored mineral comprising forming an aqueous slurry of said mineral, adding a small amount of water soluble sodium hypochlorite and a small amount of hydrogen peroxide to said slurry and then adding a water soluble hydrosulfite to said slurry.

14 Claims, No Drawings

CLAY PROCESSING

This invention relates to clay processing and more particularly to a method for improving the brightness and whiteness of clays, particularly kaolinite, beyond the level of brightness and whiteness obtained by conventional methods of treatment using hydrosulfite reducing reagents.

It is well known that the value of a clay, particularly kaolinite, as a pigment or filler is related directly to the brightness and whiteness of the clay. Most of the clays mined in the United States are discolored, some to a degree where no previous process could sufficiently improve their brightness and others where improvement in brightness and whiteness can be obtained by beneficiating techniques, thus increasing their value as pigment and filler materials.

It has been found that by a process of selective flocculation, some of the impurities which cause discoloration can be removed and the brightness and whiteness of the product considerably improved. It has also been the practice for many years to bleach clays with a hydrosulfite bleach. This could in some cases, markedly improve the brightness and whiteness of the clay.

Unfortunately, there are large tonnages of clay which are not sufficiently improved by any of these treatments to make them suitable in coating and filling practices. The most abundant clay in this category is the gray tinted family of clays as distinguished from the white, pink, cream, etc. tinted clays.

Some success in improving the brightness and whiteness of the gray tinted clays has been achieved by first treating the clay with an oxidizing bleach such as sodium hypochlorite followed by treatment with a reducing bleach such as a hydrosulfite bleach.

It is also known that these gray clays could be improved by the use of a treatment with hypochlorite bleach, followed by a treatment with hydrosulfite bleach and a selective flocculation treatment.

Strangely however, the non-gray clays did not respond to the treatment with sodium hypochlorite, sodium sulfite and selective flocculation as did the gray clays.

I have discovered a treatment which is effective on all clays and can, accordingly, be used on gray, white, pink, cream etc. clays.

In the preferred practice of my invention, I treat kaolinite with oxidizing bleach in the form of sodium hypochlorite, then add hydrogen peroxide and thoroughly mix the two into the clay and thereafter add a reducing bleach sodium hydrosulfite. Preferably, this is followed by a selective flocculation treatment. This treatment produces a markedly improved whiteness and brightness as a result of the apparent synergistic action of the reducing and oxidizing components of the system.

It is accordingly a purpose of this invention to provide an improved process for making kaolinite brighter and whiter.

Another object of this invention is a method of treating the clay slurry, after it is treated with the oxidizing agent sodium hypochlorite and before it is treated with the conventional reducing bleach, so as to improve the effectiveness of the selective flocculation process.

Briefly stated, in accordance with this improved method of treatment, both the gray tinted clay and the non-gray tinted clay are bleached and an improved brighter and whiter product is formed by the addition to the normally used clay slurry at the mine, a combination of sodium hypochlorite and hydrogen peroxide.

The use of the combination of sodium hypochlorite and hydrogen peroxide further enhances the effectiveness of the selective flocculation process. As a result of the combined treatment, the product from this clay slurry is made brighter and whiter than if the clay slurry was treated with the sodium hypochlorite or the hydrogen peroxide in separate treatment and by an amount greater than the sum of the separate improvement attained by each alone.

To illustrate, a gray clay sample whose product had an unbleached brightness of 81.2 and a conventional bleached brightness of 82.0 was treated with the sodium hypochlorite with a resulting product with an unbleached brightness of 85.4 and a bleached brightness of 86.3 and with further treatment by the selective flocculation process, had a G. E. brightness value of 89.9 and a whiteness value of 9.0 (as measured by the difference in reflectance at 400 millimicrons and at 700 millimicrons).

When the same gray clay was treated according to this invention with sodium hypochlorite and hydrogen peroxide, along with the conventional hydrosulfurous (reducing) bleach and selective flocculation, the product had a G. E. brightness value of 91.4 and a whiteness value of 7.5. It is noted here that the smaller the difference between the reading at 400 mu and the reading at 700 mu, the whiter the subject pigment.

the resulting improvement in brightness and whiteness is of great commercial significance to the clay industry and related industries since a clay having a brightness value of 91.4 and a whiteness value of 7.5, is of considerably greater value than a clay having a brightness value of 89.9 and a whiteness value of 9.0.

To further illustrate, a conventional or normal Kaolin Clay of a non-gray tint that had a product with an unbleached brightness of 85.4 and a bleached brightness of 87.8 was treated with representative quantities of sodium hypochlorite with a resulting product with an unbleached brightness value of 85.6 and a bleached brightness of 87.8. Upon further treatment with the selective flocculation process, the product had a resulting brightness value of 89.3 and a whiteness value of 10.4. Since the now known commercial process of selective flocculation is producing a product with a brightness value of 90.0 and a whiteness of 9.0, the above increase is insignificant.

When a like representative sample of the conventional clay with a non-gray tint is subjected to the treatment, according to this invention, of sodium hypochlorite and hydrogen peroxide along with the conventional hydrosulfurous (reducing) bleach and the selective flocculation treatment, the product had a G. E. brightness value of 90.8 and a whiteness value of 8.0. Here again, the increase is of great commercial significance to the clay industry and related industries, since a clay pigment with a G. E. brightness value of 90.8 and a whiteness value of 8.0 is of considerably greater value than a clay pigment with a G. E. brightness value of 89.3 and a whiteness value of 10.4.

An essential feature of this invention is the use of the hydrogen peroxide treatment in conjunction with the sodium hypochlorite treatment to produce a clay pigment or filler with an improved brightness and whiteness value.

Another essential feature of this invention is that the sodium hypochlorite and hydrogen peroxide is incorporated with the discolored clay slurry in such a manner as not to interrupt or hinder the presently used methods of processing.

Another essential feature of this invention is that hydrogen peroxide is added after the sodium hypochlorite and before the hydrosulfurous bleach and selective flocculation. The desired results are not realized if (1) the sodium hypochlorite is used without the hydrogen peroxide, or (2) the hydrogen peroxide is used without the sodium hypochlorite or (3) the hydrogen peroxide is used prior to the sodium hypochlorite, or (4) if the treatment is carried out after hydrosulfurous (reducing) bleach.

Another essential feature of this invention is the relatively low cost of the sodium hypochlorite and hydrogen peroxide and the commercial availability of the two compounds.

The quantity of sodium hypochlorite employed is within the range of ¼ to 5 gallons of a commercially available (15% NaOCl) aqueous solution per ton of clay mineral. The quantity of hydrogen peroxide employed is within the range of ¼ to 3 gallons of a commercially available (35% $H_2O_2$) aqueous solution per ton of clay mineral. Very good results have been obtained by using 2.5 gallons of sodium hypochlorite and ½ gallon of hydrogen peroxide per ton of clay mineral.

In putting the invention into practice, the sodium hypochlorite can be added to the clay slurry in its normally processed state, and after mixing sufficiently to insure its incorporation into the system, from 1 to 24 hours, then the hydrogen peroxide can be added to the clay slurry. The system should continue to be mixed to insure complete incorporation of the treatment agents. It is important to allow sufficient time for the reagents to mix into the system.

I have found the present agitation system now used to keep the clay slurry in suspension to be adequate, providing enough time is allowed to insure the mixing.

The normal time that it takes to move the clay slurry from the mine to the plant for processing will be sufficient, provided good mixing is accomplished prior to its being moved to the plant.

Although the invention is designed to work best in a slurry system of 25 to 45 percent clay and 75 to 55 percent water in a dispersed state, the reagents can also be incorporated into a clay mass of 70 to 85 percent clay and 30 to 15 percent water if the mixing is sufficient to incorporate the reagents into the clay mass.

Although the reagents can be added as received from their commercially available source, they can be diluted with water, prior to the addition, without any harmful effects on the finished product.

The temperature of the clay mass does not have any significant bearing on the invention. Temperatures ranging from 45° up to 200° F. have been used with virtually the same results. Ambient temperature is very satisfactory for this treatment.

The reagents can be incorporated into the crude clay slurry, but they work equally as well on any of the various size fractions from the crude slurry.

When the treatment of this invention is applied to a crude clay as described above, the clay slurry can then be beneficiated into the size fraction desired and normal processing procedures used.

The reducing bleach is applied in an acid environment and the acidification for the reducing bleach can be accomplished with sulfuric acid, aluminum sulfate or a combination of the two or any of the mineral acids normally employed in the Kaolin clay processing industry.

The reducing bleach can be accomplished by the usual hydrosulfurite bleaching reagents, e.g., zinc hydrosulfite or sodium hydrosulfite.

Where a selective flocculation step is incroporated after the bleach, the clay can be filtered and dried or the filtered clay can be redispersed as with a tripolyphosphate dispersant and supplied in slurry form.

The process of this invention is especially applicable to the Kaolin clays that do not respond in the desired manner to the conventional bleaching and processing techniques.

In applying the process to a Kaolin clay, the clay can be raw clay as mined, a suitable clay slurry or pulp, or a suitable size fraction of raw clay. The process can also be used on Kaolin clays that do not respond to the conventional bleaching process and by leaving out the selective flocculation step, these processed clays will then be of acceptable brightness and whiteness to the related industries.

This invention is of particular importance because it enables the Kaolin industry to utilize large tonnages of kaolin clay that was heretofore not of acceptable quality.

This invention can perhaps be best understood by reference to the following examples illustrating presently preferred practices of my invention.

In the examples, brightness refers to values obtained according to specifications set up by TAPPI Standard Method T-646—54. The method measures the light reflectance of a clay sample at 457 millimicrons and thus gives a quantitative indication of its brightness. The whiteness is a value received by subtracting the reflectance reading at 400 millimicrons from the reflectance reading at 700 millimicrons and thereby, giving a quantitative indication of the whiteness of the clay sample.

EXAMPLE I

A series of tests were run, at room temperature, on a sample of gray Kaolin clay to investigate the effect of the addition of sodium hypochlorite, hydrogen peroxide and a combination of the two reagents on the normal hydrosulfurous bleaching process.

A 3,205 gram sample of gray Georgia Kaolin containing 2,500 grams solids and the balance water was blunged at 30 percent solids in 3 liters of water using a commercial type Waring Blender. The clay was dispersed with 30 milliliters of a 10 percent aqueous solution of 67 percent tripolyphosphate and 33 percent sodium carbonate. The mixture was blunged for 2 minutes at low speed. The pH of the slurry was 6.4. The clay slurry was degritted by passing it through a 100 mesh screen. The clay slurry was divided into four equal portions and treated as follows:

Portion 1.

The clay slurry was centrifuged to produce a resulting fine size fraction, as the effluent, of 90% -2$\mu$. The fine fraction was acidified to a pH of 3.0 with a 10 percent solution of 50 parts of sulfuric acid and 50 parts of aluminum sulfate. The fine fraction was then incrementally bleached with sodium hydrosulfite. The samples were filtered, dried, and the brightness values obtained.

Portion 2.

The clay slurry was treated with 3 gallons of a 15% NaOCl aqueous solution per ton of clay and slowly agitated (just enough agitation to keep the clay particles in suspension) for a period of 16 hours. The clay sample was centrifuged to produce a resulting fine size fraction, as the effluent, of 90% -2$\mu$. The fine fraction was then incrementally bleached with sodium hydrosulfite. The samples were filtered, dried, and the brightness values obtained.

Portion 3.

The clay slurry was treated with 3 gallons of a 15% NaOCl aqueous solution per ton of clay and slowly agitated for a period of 16 hours. The sample was then treated with a 0.5 gallon of a 35 percent hydrogen peroxide aqueous solution per ton of clay and allowed to agitate slowly for an additional 30 minutes. The clay sample was then centrifuged to produce a resulting fine size fraction, as the effluent, of 90% -2$\mu$. The fine fraction was acidified to a pH of 3.0 with a 10 percent solution of 50 parts of sulfuric acid and 50 parts of aluminum sulfate. The fine fraction was then incrementally bleached with sodium hydrosulfite. The samples were filtered, dried and the brightness values obtained.

Portion 4.

The clay slurry was treated with 0.5 gallons of a 35 percent hydrogen peroxide solution per ton of clay and allowed to agitate slowly for a period of 16 hours. The clay sample was then centrifuged to produce a resulting fine size fraction, as the effluent, of 90% -2$\mu$. The fine fraction was acidified to a pH of 3.0 with a 10 percent solution of 50 parts of sulfuric acid and 50 parts of aluminum sulfate. The fine fraction was incremently bleached with sodium hydrosulfite. The samples were filtered, dried and brightness values obtained.

The amounts of sodium hypochlorite and hydrogen peroxide used in this example were determined by running a series of tests on the representative gray Georgia Kaolin used in the example to determine the optimum level for each of the two reagents, sodium hypochlorite and hydrogen peroxide. The dosages represented in this example should not be held as the only amount that could be used. It has been previously determined that different clay deposits require varying amounts of reagents for optimum results and any man skilled in the art of clay treatment can readily determine the optimum amount to be used on a particular clay.

The brightness values obtained on the several portion of Example I are tabulated in Table I which follows:

TABLE I

Effect of sodium hypochlorite, hydrogen peroxide and a combination of the two on the bleaching of gray Georgia Kaolin.

BRIGHTNESS VALUES

| $Na_2S_2O_4$ lb./ton | Control | Treated with NaOCl | Treated with NaOCl+$H_2O_2$ | Treated with $H_2O_2$ |
|---|---|---|---|---|
| Unbleached | 81.2 | 85.4 | 86.8 | 82.0 |
| 3 lb. per ton | 81.8 | 86.2 | 87.3 | 82.1 |
| 6 lb. per ton | 81.8 | 87.0 | 88.2 | 82.1 |
| 9 lb. per ton | 81.8 | 87.0 | 88.2 | 82.1 |

EXAMPLE 2

Samples were made identical to Example I with the exception that after the reagents were added and the specific time had elapsed, the following procedure was used.

All samples were ground in a Model S–1 Union Atrittor for a period of 3 minutes at 600 r.p.m. employing a 16–20 mesh size ceramedia at a 1.5 to 1 ratio ceramedia to clay volume basis. The samples were then separated from the ceramedia by means of screening and samples centrifuged to a resulting fine fraction as the effluent, of 90 percent less than 2 microns. The samples were then acidified to a pH of 3.0 c̄ a 10 percent solution of 50 parts of sulfuric acid and 50 parts aluminum sulfate. The samples were then heated to 60 percent centigrade for a period of 30 minutes and then bleached at 10 lb. per ton of sodium hydrosulfite. Samples were filtered and rinsed by slurring in warm water and refiltered. Samples were then re-slurried in a dispersed state using 20 lb. tripolyphosphate per ton. Samples were diluted to 10 percent solids and allowed to slowly agitate for a period of 30 minutes. All samples were selectively flocced by using 100 cc. of a 0.025 percent solution of an organic flocculating agent (trade name Nalco 672) per 100 gms. of clay. Samples were rinsed by removing effluent, re-addition of water and re-slurrying by mild agitation. This method of rinsing was continued until effluent was clear, water added to resulting flocced clay and temperature elevated to 60° C. Samples were acidified to a pH of 3.0 c̄ the foregoing mention acidified reagents and hydrogen peroxide added in the amount of 1cc of a 35% $H_2O_2$ aqueous solution/100 gms. of clay. Samples were agitated for 30 minutes filtered, dried and brightness and whiteness values determined.

The effect of NaOCl, $H_2O_2$ and the combination of the two on the selective flocculation of gray Georgia Kaolin gave results set out in Table II.

Table II

|  | Control No Treatment | NaOCl | NaOCl and $H_2O_2$ | $H_2O_2$ |
|---|---|---|---|---|
| Brightness | 85.4 | 89.9 | 91.4 | 86.3 |
| Whiteness | 14.6 | 9.0 | 7.9 | 12.8 |

EXAMPLE 3

A sample of discolored non-gray kaolin was treated according to the procedure set out in example 1. The results are set out in Table III.

TABLE III

|  | Control | NaOCl | NaOCl and $H_2O_2$ | $H_2O_2$ |
|---|---|---|---|---|
| Unbl. | 85.3 | 85.4 | 86.2 | 85.4 |
| 3 lb. | 86.8 | 86.4 | 87.0 | 86.4 |
| 6 lb. | 87.6 | 87.6 | 88.2 | 87.8 |
| 9 lb. | 87.6 | 87.6 | 88.4 | 87.8 |

EXAMPLE 4

A sample of the same discolored non-gray kaolin of Example 3 was treated according to the method set out in Example 2. The results of brightness and whiteness tests are set out in Table IV

TABLE IV

|  | Control | NaOCl | NaOCl and $H_2O_2$ | $H_2O_2$ |
|---|---|---|---|---|
| Brightness | 88.4 | 88.6 | 9.06 | 88.5 |
| Whiteness | 12.4 | 12.3 | 8.2 | 12.3 |

EXAMPLE 5

Another sample of gray kaolin from a different area of Georgia from the sample described in Example 1 was treated according to the method as set forth in Example 1. the brightness was measured and is tabulated in Table V.

TABLE V

| $Na_2S_2O_4$ | Control | NaOCl | NaOCl and $H_2O_2$ | $H_2O_2$ |
|---|---|---|---|---|
| Unbl. | 81.0 | 84.1 | 85.3 | 83.5 |
| 3 lb. | 83.9 | 86.1 | 87.4 | 84.5 |
| 6 lb. | 84.0 | 87.5 | 88.5 | 85.0 |
| 9 lb. | 84.4 | 87.5 | 88.5 | 85.0 |

EXAMPLE 6

A second portion of gray clay from Example 5 was treated according to the method set out in Example 3 to provide selective flocculation. The brightness and whiteness of the resulting produce were measured and are tabulated in Table VI.

TABLE VI

|  | Control | NaOCl | NaOCl and $H_2O_2$ | $H_2O_2$ |
|---|---|---|---|---|
| Brightness | 86.0 | 89.5 | 91.0 | 88.5 |
| Whiteness | 13.3 | 9.2 | 6.9 | 11.2 |

It is apparent from the foregoing examples that there is a clear synergistic effect between the sodium hypochlorite and hydrogen peroxide on the improvement of brightness and whiteness in discolored clays. This improvement is very significant and makes available for use in high quality pigments a vast tonnage of clays heretofore unavailable White I have illustrated and described certain presently preferred practices and embodiments of my invention in the foregoing specification, it will be understood that this invention may be otherwise embodied within the scope of the following claims.

I claim:

1. A method for bleaching a discolored mineral such as clay comprising the steps of forming an aqueous mixture of said mineral, incorporating a small amount of a water soluble sodium hypochlorite and a small amount of hydrogen peroxide into said mixture, agitating said mixture until said sodium hypochlorite and hydrogen peroxide are thoroughly incorporated into said mixture and then adding to said mixture a water soluble hydrosulfite bleaching agent.

2. The method of claim 1 in which said mineral is a silicate mineral.

3. The method of claim 1 in which said mineral is clay.

4. The method of claim 1 in which said mineral is kaolin clay.

5. The method of claim 1 in which said mineral is a gray kaolin.

6. The method of claim 1 in which said mineral is a discolored non-gray kaolin.

7. The method of claim 1 in which the said NaOCl is employed in amount in the range of 0.25 to 5.0 gallons of a 15 percent aqueous solution per ton of mineral being treated and said $H_2O_2$ is employed in amount in the range of 0.25 to 3.0 gallons of a 35 percent aqueous solution per ton of mineral being bleached.

8. A method for improving the brightness and whiteness of a kaolin clay by the addition of sodium hypochlorite and hydrogen peroxide to an aqueous mixture of said gray kaolin and agitating said mixture until said reagents are thoroughly incorporated into said mixture.

9. The method of claim 8 in which said kaolin clay is gray kaolin clay.

10. The method of claim 8 in which said kaolin clay is discolored non-gray kaolin clay.

11. The method for improving the brightness and whiteness of kaolin clay as claimed in claim 1 wherein the clay is selectively flocculated following the addition of hydrosulfite bleaching agent.

12. The method of claim 11 wherein the clay is a gray kaolin.

13. The method of claim 11 wherein the clay is a discolored non-gray kaolin.

14. The method of claim 1 wherein the water soluble hydrosulfite bleaching agent is selected from the group consisting of sodium hydrosulfite and zinc hydrosulfite.

* * * * *